June 7, 1949. H. F. ROACH ET AL 2,472,341
MOTOR ACCELERATION MEANS
Filed April 18, 1947

Inventors
William R. Nelson & Harding F. Roach
by Harry L. Yinger
Attorney

Witness
Edward P. Seeley

Patented June 7, 1949

2,472,341

UNITED STATES PATENT OFFICE 2,472,341

MOTOR ACCELERATION MEANS

Harding F. Roach and William R. Nelson,
Des Moines, Iowa

Application April 18, 1947, Serial No. 742,320

3 Claims. (Cl. 74—472)

This invention relates to a transmission means placed between a power source and a member to be actuated, such as a lawn mower, and further a means connected with the transmission means and the power source to accelerate the power unit to the desired operating speed when the transmission means is placed into operative relation with the power source and decelerated to an idling speed when the transmission is placed in inoperative position.

In the transmission of power from a power source through a transmission means, it is desirable to have the power source operating at an idling speed before the transmission means is placed in operative relation to transmit power to a member to be driven. It is desirable after the transmission is placed in operative relation that the power unit be accelerated in speed to put the member to be operated into operation at the speed desired. The present application combines the placing in operative relation of the transmission and the acceleration of the power source into one operation.

It is an object of the invention, among others, to provide a transmission means between a power unit and a member to be operated which accelerates the power unit when the transmission means is placed into operative relation; a transmission means when placed in inoperative relation which allows the power unit to return to an idling speed; a transmission means having a means associated therewith which accelerates the power unit when the transmission is in operative relation and operates to decelerate the power unit when the transmission is placed in inoperative relation; a means between a transmission means and a power unit actuating the power unit which operates automatic and requires no special skill to operate; a means between a transmission means and a power unit actuating the power unit that is economical in construction and durable, economical and long lasting in operation and is simple in construction, easy to manufacture, and simple to mount.

In carrying out the objects of the invention there is a motive power unit in combination with a power transmission means to transmit power from the motive power unit to a member to be operated. The power transmission means is made up of a first mentioned rotatable means connected to the motive power unit and a second rotatable means associated with the first mentioned rotatable means. A second pair of rotatable means is spaced from the first and second mentioned rotatable means with the second pair of rotatable means. The transmission means is put into operative relation by increasing the space between the first and second mentioned rotatable means with relation to the second pair of rotatable means to bring the connecting means into engagement with the rotatable members. A bracket means may be attached to the second pair of rotatable means with the bracket also attached movably to the motive power unit so that the second pair of rotatable means pivot about the motive power unit on the bracket when the transmission means is placed in operative relation.

The improvement in the present invention resides in a bar member associated with the second pair of rotatable means to accelerate the motive power unit to the desired operating speed when the transmission means is placed into operative relation. The bar member has one end thereof contacting a projection extending from the bracket attached to the pair of rotatable means with the bar member pivotally mounted on the motive power unit. The other end of the bar member is attached to the motive power unit to accelerate the power unit to the desired speed. There is a screw in the end of the bar member contacting the projection on the bracket which is adjustable to vary the length of movement of the end of the bar.

With the foregoing and other objects in view, the invention will be more fully described hereinafter and will be particularly pointed out in the claims appended hereto.

In the drawings, wherein like symbols refer to like or corresponding parts throughout the several views.

The present invention is an improvement over application Serial No. 682,938 filed July 11, 1946 by the same applicant's which application relates to the new and novel transmission means. In the present application, the transmission is the same as referred to in the above identified application with the improvement of accelerating the motive power unit, represented generally at 1, when the transmission means, represented generally at 2, is placed into operative relation.

Figure 2:
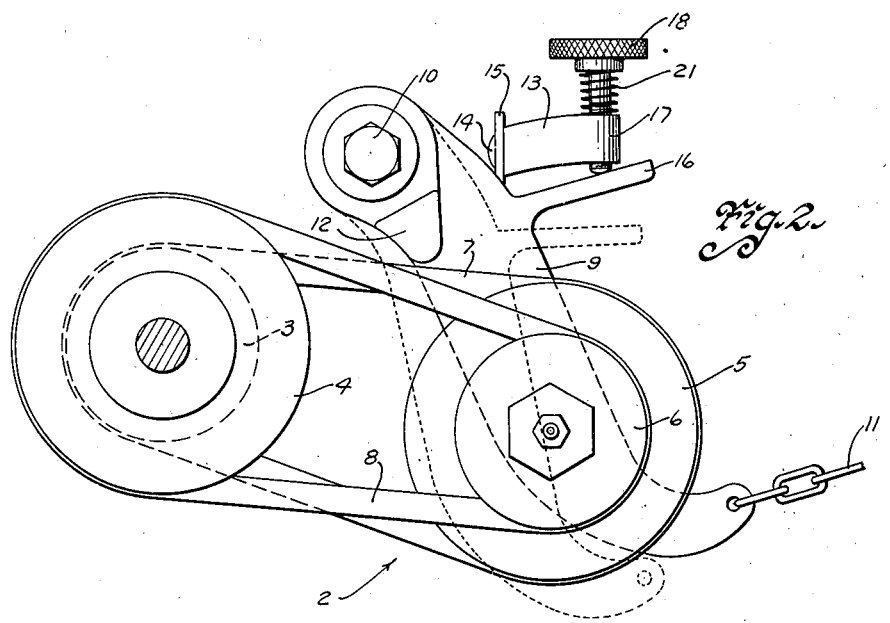
Figure 2 is a side elevational view of the transmission means and an end elevational view of the end of the bar member associated with the transmission means.

The transmission means 2 has one rotatable means 3 shown in dotted line in Figure 2 and a second rotatable means 4 associated with the first rotatable means and rotatable with respect to each other. The rotatable means 4 connects to a member to be actuated such as a lawn mower (not shown). A pair of rotatable means 5 and 6, in the form of pulley members are attached and rotatable together and spaced from the first and second rotatable means 3 and 4, a belt means 7 connects pulley 5 with rotatable means 3 while a belt means 8 connects pulley 6 with rotatable means 4. The rotatable means 3 and 4 and pulleys 5 and 6 may be made of different sizes to regulate speed as clearly set forth in the previous application.

A bracket member 9 is movably connected to the members 5 and 6 with the bracket 9 in turn movably connected to the motive power unit by a bolt 10. A chain 11 is connected to the lower end of the bracket 9. An outwardly pull on the chain 11 will pull members 5 and 6 outwardly with the members 5 and 6 pivoting about bolt 10 to increase the space between rotatable means 3 and 4 and members 5 and 6. The belts 7 and 8 finally limit the outward movement of the members 5 and 6 and are brought into contact with members 3 and 4; and members 5 and 6 and power is transmitted from the motive power unit 1 to the member to be actuated. The dotted line position shown in Figure 2 represents the position of bracket 9 when no force is exerted on the chain 11. The dotted line position of Figure 2 represents the inoperable position of the transmission 2 while the solid line position of Figure 2 represents the operable position. The portion 12 on the bracket 9 serves as a limiting means to prevent the belts 7 and 8 from assuming a circular shape and thus contacting the pulleys and transmitting some power. The structure up to this point has been described as a power transmission means, a clutch and a special reduction means.

A bar member 13 is pivotally mounted at 14 to a supporting member 15 which in turn is mounted on the power unit 1. The bracket 9 has an outstanding projection 16 and the bar 13 an outstanding projection 17 which projections 16 and 17 are more or less parallel. A screw 18 is adjustable in the projection 17 and contacts the projection 16 when the transmission 2 is placed into operable relation. The opposite end of the bar member 13 connects with spring means 19 which connects with the carburetor 20 of the motive power unit.

Figure 1:
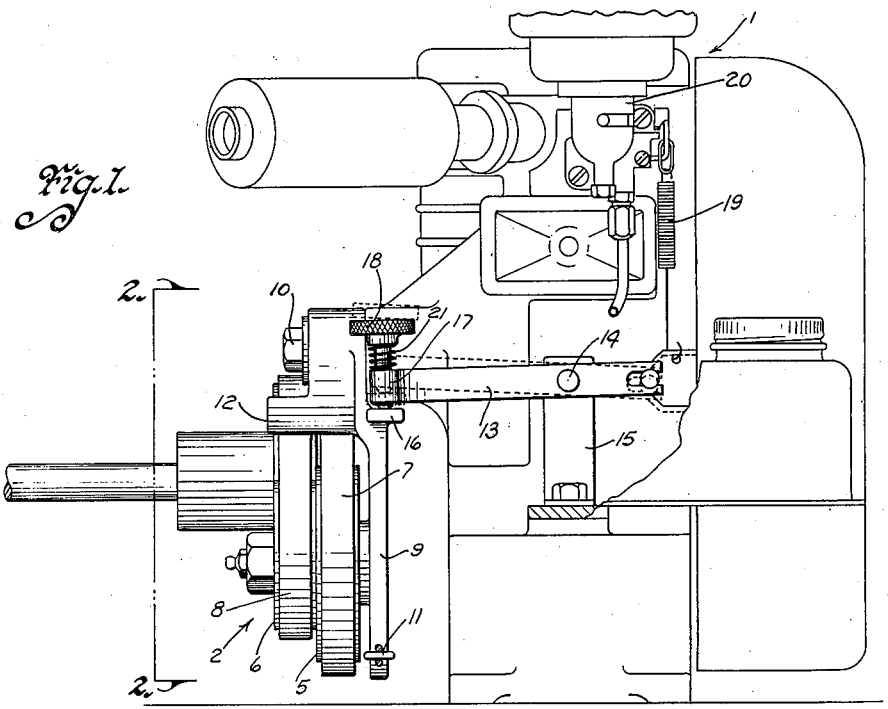
Figure 1 is a front elevational view showing the motive power unit and the transmission means with the bar member connected between the two.

In operation, the power unit 1 is set at an idling speed and operates at the idling speed when the transmission means 2 is in inoperable position as shown by the dotted lines of Figure 2. When the transmission 2 is placed into operation as shown by solid lines of Figure 2, projection 16 is in contact with screw 18 and lifts the left end of bar 13 upwardly as shown in dotted line position in Figure 1. The bar 13 pivots around point 14 thus lowering the right end of bar 13 which in turn gives a downward pull on the spring 19 attached to carburetor 20 to open carburetor 20 to admit more fuel thereto and thus increase the speed of the motor.

Thus it can be seen that as the transmission means 2 is placed into operation, the power unit 1 is accelerated into the desired operating speed. If it is desired to change the operating speed the screw 18 may be adjusted to lengthen or shorten the stroke of the right side of bar 13 and the spring 21 will hold the screw from moving out of adjustment. When the transmission 2 is placed in inoperative position, the power unit 1 will return to idling speed. An acceleration and deceleration means is provided for the power unit that is operated upon the transmission means being placed in operative or inoperative position without any effect on governor means that may be associated with the power unit 1.

While the invention has been described in connection with several specific embodiments, it is to be understood that the words which have been used are words of description rather than limitation, and that practice of the invention within the scope of the appended claims may be resorted to without departing from the scope of the invention in all its aspects.

We claim:

1. In combination with a motive power unit and a power transmission means to transmit power from the motive power unit to a member to be operated, said power transmission means comprising a first mentioned rotatable means connected to the motive power unit, a second rotatable means associated with the first mentioned rotatable means, a second pair of rotatable means spaced from the first and second mentioned rotatable means with a bracket means attached thereto, said bracket means attached movably to the motive power unit, means connecting the first and second mentioned rotatable means with the second pair of rotatable means, the transmission means put into operative relation by the second pair of rotatable means moving on the supporting bracket to increase the space between the first and second rotatable means to bring the connecting means into engagement with the rotatable members and the improvement comprising a bar member having one end thereof contacting the bracket and pivotally mounted on the motive power unit, the other end of said bar member attached to the motive power unit to accelerate the motive power unit to the desired operating speed when the transmission means is placed into operative relation by the bar member being pivoted when the transmission means is engaged.

2. In combination with a motive power unit and a power transmission means to transmit power from the motive power unit to a member to be operated, said power transmission means comprising a first mentioned rotatable means connected to the motive power unit, a second rotatable means asociated with the first mentioned rotatable means, a second pair of rotatable means spaced from the first and second mentioned rotatable means with a bracket means attached thereto, said bracket means attached movably to the motive power unit, means connecting the first and second mentioned rotatable means with the second pair of rotatable means, the transmission means put into operative relation by the second pair of rotatable means moving on the supporting bracket to increase the space between the first and second rotatable means to bring the connecting means into engagement with the rotatable members and the improvement comprising a bar member with one end thereof contacting a projection extending from the bracket, said bar member pivotally mounted on the motive power unit, the other end of said bar member attached to the motive power unit to accelerate the motive power unit to the desired operating speed when the transmission means is placed into operative relation by the bar member being pivoted when the transmission means is engaged.

3. In combination with a motive power unit and a power transmission means to transmit power from the motive power unit to a member to be operated, said power transmission means comprising a first mentioned rotatable means connected to the motive power unit, a second rotatable means associated with the first mentioned rotatable means, a second pair of rotatable means spaced from the first and second mentioned rotatable means with a bracket means attached thereto, said bracket means attached movably to the motive power unit, means connecting the first and second mentioned rotatable means with the second pair of rotatable means, the transmission means put into operative relation by the second pair of rotatable means moving on the supporting bracket to increase the space between the first and second rotatable means to bring the connecting means into engagement with the rotatable members and the improvement comprising a bar member with one end thereof contacting a projection extending from the bracket, said bar member pivotally mounted on the motive power unit, a screw in one end of the bar member contacting the projection on the bracket, the other end of said bar member attached to the motive power unit to accelerate the motive power unit to the desired operating speed when the transmission means is placed into operative relation by the bar member being pivoted when the transmission means is engaged with the screw in the opposite end of the bar being adjustable to vary the length of movement of the end of the bar member attached to the motive power unit.

HARDING F. ROACH.
WILLIAM R. NELSON.

REFERENCES CITED

The following references are of record in the file of this patent:

UNITED STATES PATENTS

| Number | Name | Date |
|---|---|---|
| 933,710 | Johnson | Sept. 7, 1909 |
| 1,136,246 | Levin | Apr. 20, 1915 |
| 1,367,306 | De Brun | Feb. 1, 1921 |
| 2,292,580 | Moyer | Aug. 11, 1942 |

FOREIGN PATENTS

| Number | Country | Date |
|---|---|---|
| 213,423 | Great Britain | Apr. 3, 1924 |